(12) United States Patent
Henderson et al.

(10) Patent No.: US 8,674,947 B2
(45) Date of Patent: Mar. 18, 2014

(54) LATERAL PRESSURE SENSORS FOR TOUCH SCREENS

(75) Inventors: Andrew Henderson, Malmo (SE); Mike Golding, Ware (GB); Andy Balm, St Albans (GB)

(73) Assignee: Xerox Corporation, Norwalk, CT (US)

( * ) Notice: Subject to any disclaimer, the term of this patent is extended or adjusted under 35 U.S.C. 154(b) by 889 days.

(21) Appl. No.: 11/962,423

(22) Filed: Dec. 21, 2007

(65) Prior Publication Data

US 2009/0160781 A1    Jun. 25, 2009

(51) Int. Cl.
*G06F 3/042* (2006.01)
(52) U.S. Cl.
USPC ............................. 345/173; 345/161
(58) Field of Classification Search
CPC .............. G06F 3/3547; G06F 3/0414; G06F 2203/04105
USPC ............. 345/173–184, 161; 178/18.01–20.04
See application file for complete search history.

(56) References Cited

U.S. PATENT DOCUMENTS

| | | | | |
|---|---|---|---|---|
| 5,053,758 A * | 10/1991 | Cornett et al. | ................ | 345/174 |
| 6,208,328 B1 * | 3/2001 | Kawachiya et al. | .......... | 345/157 |
| 6,509,890 B1 * | 1/2003 | May | ............................. | 345/167 |
| 6,975,306 B2 * | 12/2005 | Hinckley et al. | .............. | 345/173 |
| 7,102,626 B2 * | 9/2006 | Denny, III | ....................... | 345/179 |
| 2001/0050676 A1 * | 12/2001 | Kocsis | ......................... | 345/173 |
| 2003/0080947 A1 * | 5/2003 | Genest et al. | .................. | 345/173 |
| 2005/0024341 A1 * | 2/2005 | Gillespie et al. | .............. | 345/173 |
| 2006/0007178 A1 * | 1/2006 | Davis | ............................ | 345/173 |
| 2006/0119582 A1 * | 6/2006 | Ng et al. | ........................ | 345/168 |
| 2006/0197753 A1 * | 9/2006 | Hotelling | ....................... | 345/173 |
| 2006/0238517 A1 * | 10/2006 | King et al. | .................... | 345/173 |
| 2007/0063980 A1 * | 3/2007 | Eich et al. | ..................... | 345/173 |
| 2007/0120822 A1 * | 5/2007 | Iso | ................................. | 345/156 |
| 2009/0303187 A1 * | 12/2009 | Pallakoff | ...................... | 345/169 |

* cited by examiner

*Primary Examiner* — Amare Mengistu
*Assistant Examiner* — Vinh Lam
(74) *Attorney, Agent, or Firm* — MH2 Technology Law Group LLP

(57) ABSTRACT

An interactive touch screen and method of manipulating an image on an interactive touch screen. The device includes a user interface screen, an interactive image in the user interface screen, at least one pressure sensor positioned adjacent a periphery of the user interface screen, and a pressure sensitive widget responsive to pressure in a direction of said at least one pressure sensor for manipulating the image in a direction of applied pressure. The method includes providing at least one pressure sensor adjacent a periphery of the interactive touch screen, providing a widget in the interactive touch screen without obscuring the image, applying directional pressure to the widget for activating at least one sensor and without sliding the widget in the interactive touch screen, and moving the image in a direction of applied pressure.

11 Claims, 2 Drawing Sheets

LATERAL PRESSURE SENSORS FOR TOUCH SCREENS

DESCRIPTION OF THE INVENTION

1. Field of the Invention

The present invention generally relates to an interactive user screen, and more specifically to a device and method for controlling lateral movement of an image using a stationary widget on the interactive user screen.

2. Background of the Invention

Touch screens have been known in the art and are common in everyday devices such as a personal digital assistant (PDA), mobile phones, airplanes, automobiles, gaming consoles, tablet computers, kiosks, machine control systems, appliances, retail settings including point of sale systems and automated teller machines, and handheld display devices of every kind. Essentially touch screens can be found where a keyboard and/or mouse do not allow a satisfactory, intuitive, rapid, or accurate interaction by the user with the display's content.

By way of a general explanation, touch screens can include display overlays which have the ability to display and receive information on the same screen. The overlay can allow a display to be used as an input device, removing the keyboard and/or the mouse as the primary input device for interacting with the display's content.

Recent developments have been directed to multipoint touch screens facilitating the tracking of more than one finger on the screen. With these developments, operations that are only possible with more than one finger can be achieved. These devices also allow multiple users to interact with the touch screen simultaneously.

A primary advantage of the interactive touch screen is the ability to easily select and then move images on the screen with the user's finger, end of a writing implement, stylus, or the like. However, movement of any of these implements across the screen, while not necessarily damaging the screen, can pose problems for the user. For example, a repeated dragging of a finger across a touch screen can cause stress on a human finger, especially over time, since significant pressure can be required and the screen is non-flexible. This stress can be alleviated with the use of a pen or other device to add leverage, but the introduction of such items can sometimes be problematic depending on the desired use (for example, public kiosks such as ATMs). Also, fine motor control is better achieved with a stylus, a finger being a rather broad and ambiguous point of contact with the screen.

In addition, when passing a user's finger over a surface of the touch screen, skin oil or other residue can be left on the screen and potentially lead to obscuring the images on the display. Further, visibility of an image can be blocked simply due to a position of a user's finger tip or other implement on the screen. For example, in known touch screens, the point of contact will be with the object or image to be displayed or moved on the screen. Movement or other activation is achieved by dragging the finger and thus the particular contacted image along the screen. Lifting of the finger from the point of contact can terminate an operation, thus frustrating the user and extending usage time. In yet another example, scrolling through lists using a slider control on tables can be problematic since the finger tends to jump when moving across the screen surface, thus rendering inconsistent movement of the image. Finally, it should be noted that styluses do not work on capacitive touch screens nor do gloved fingers, thus limiting the use of such in the industry.

Accordingly, it has been difficult to consistently achieve a desired interaction with touch screen surfaces, particularly when moving lists, scroll bars, or other objects and images around on an interactive touch screen. For these and other reasons, alternatives are sought to overcome these limitations of known interactive touch screen devices.

Thus, there is a need to overcome these and other problems of the prior art and to provide a method and apparatus for controlling movement of an image across an interactive touch screen without obscuring the image or moving an interactive implement across a surface of the screen.

SUMMARY OF THE INVENTION

Touch screen technologies provide an interactive tool for managing data.

In simplest terms, actuation of an image, cursor or other item on a touch screen will include direct contact with that image to be moved. However, touching of the image also tends to obscure the image, thereby restricting free visibility and movement of images over a display.

Therefore, the present invention has been made in view of the above circumstances and provides an interactive user screen, and more specifically a device and method for controlling lateral movement of an image using a stationary widget on the interactive user screen.

In accordance with the present teachings, an interactive touch screen is provided.

The exemplary interactive touch screen can include a user interface screen, an interactive image in the user interface screen, at least one pressure sensor positioned adjacent a periphery of the user interface screen, and a pressure sensitive widget responsive to directional pressure, thereby activating the at least one pressure sensor and manipulating the image in a direction of applied pressure.

In accordance with the present teachings, a method of manipulating an image on an interactive touch screen is provided.

The exemplary method can include providing at least one pressure sensor adjacent a periphery of the interactive touch screen, providing a widget in the interactive touch screen without obscuring the image, applying directional pressure to the widget for activating at least one sensor and without sliding the widget in the interactive touch screen, and moving the image in a direction of applied pressure.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. However, one of ordinary skill in the art would readily recognize that the same principles are equally applicable to, and can be implemented in devices other than coatings and layers for electrophotographic imaging type devices, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents. Wherever possible, the same reference numbers will be used throughout the drawings to refer to the same or like parts.

Embodiments pertain generally to an interactive touch screen having greater flexibility in how user manipulates information on a screen. More specifically an improved ease of use can be achieved with the disclosed interactive touch screen.

To improve an interactive touch screen, the present invention provides a touch screen with pressure sensors configured to sense lateral force applied to the screen surface. This configuration can permit icons and other visual artifacts on the screen to behave as joysticks which would facilitate moving images and scrolling through lists, etc. Further, the device can be implemented on any product with a screen based interface.

Figure 1A:
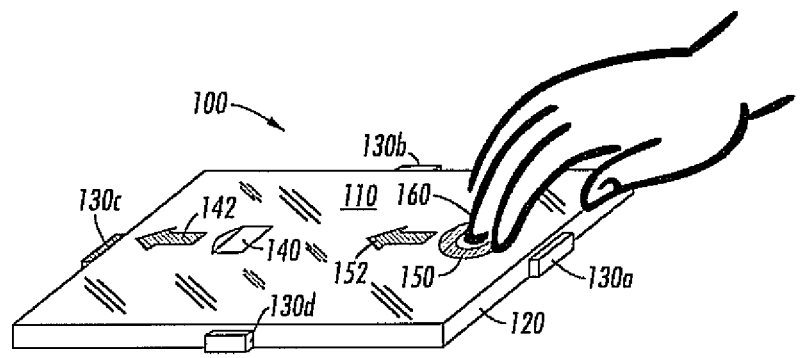
FIG. 1A is a perspective view of an interactive user screen illustrating an operation in accordance with embodiments of the present teachings.
Figure 1B:
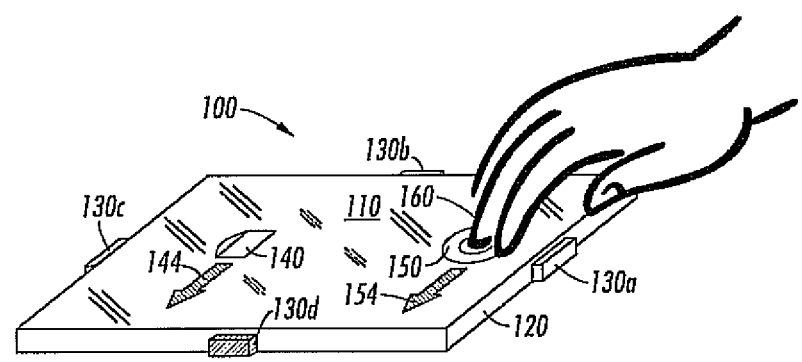
FIG. 1B is a perspective view of the interactive user screen illustrating another operation in accordance with embodiments of the present teachings.
Figure 1C:
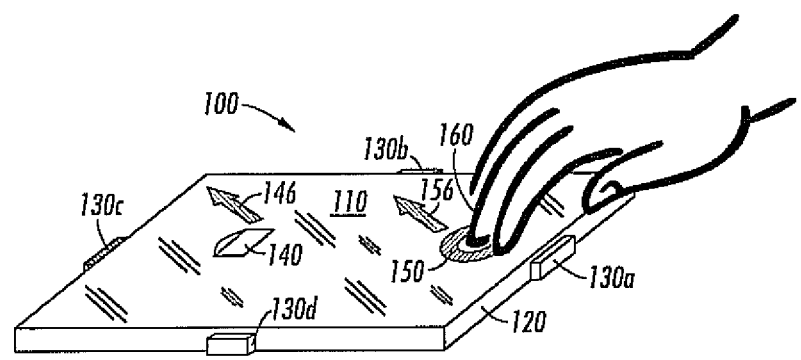
FIG. 1C is a perspective view of the interactive user screen illustrating a further operation in accordance with embodiments of the present teachings.

Referring first to FIGS. 1A, 1B and 1C, various operations of an exemplary touch screen 100 are depicted. As depicted in the figures, each touch screen device 100 is of a dimension to include a screen surface 110, edges 120 at a periphery of the screen surface 110, and at least one pressure sensor 130

The screen surface 110 can be characterized as a user interface screen, the construction of which will not be described in detail. At least a portion of the screen surface is devoted to display of an image, icon, etc. 140, and a remaining portion of the screen surface can be devoted to indicia other than that which is interacted with by the user. For example, non-interactive indicia can include manufacturer information or user instructions. In addition, a user interface widget 150 can be provided at a predetermined spot on the screen. The widget 150 can tale any shape or size according to design aesthetics and device requirements. In addition, the widget 150 can be positioned outside of the image display 140 in order to affect movement of the image 140 without obstruction by the widget 150 or a user's finger 160 actuating the widget. While the widget 150 is depicted in a lower center portion of the screen 110, any suitable location for the widget can be used. In addition, the widget 150 can be relocated on the screen by a user depending upon a particular application; however, the widget remains stationary during a particular function such as moving the display image 140 around on the screen 110.

The pressure sensors 130 can be positioned at lateral edges of the screen 110 as shown. For example, in the case of a rectangular screen, at least one pressure sensor 130 can be positioned at each lateral edge of the screen such as at 130a, 130b, 130c, and 130d. In the case of a non-rectangular screen, the pressure sensors 130 can be evenly or otherwise spaced around the edges of the screen according to an intended end use. The pressure sensors 130 can be integrally connected to the widget 150, electronically or otherwise such that application of a lateral directional force to the widget 150 directly activates a corresponding pressure sensor 130, and enables a corresponding movement of the interactive display image 140.

Actuation of the widget 150 can include an application of pressure by a user's finger 160. The applied pressure can be in any lateral direction, for example within up to eight different directions with respect to a center point of the widget 150. As depicted in FIG. 1A, a lateral pressure on the widget 150 in a direction of arrow 152 activates pressure sensor 130c, resulting in a corresponding movement of the image 140 in direction 142 across the screen 110. Likewise, as depicted in FIG. 11B, a lateral pressure on the widget 150 in a direction of arrow 154 activates pressure sensor 130d, resulting in a corresponding movement of the image 140 in a direction 144 across the screen 110. In the case of an angular image movement in a direction not directly aligned with a pressure sensor such as that depicted in FIG. 1C, a lateral pressure on the widget 150 in an angular direction of arrow 156 activates pressure sensors 130b and 130c resulting in a corresponding movement of the image in a direction 146 across the screen 110. In other words, desired motion in a direction between two adjacent pressure sensors will activate the two closest sensors resulting in a movement of the image directly bisecting those sensors.

Adding pressure sensors to the edges of a touch screen that can detect lateral force will enable a new generation of touch screen interface widgets with movement control. Specifically, the widgets will allow the user to move a cursor, object or scroll lists in various directions by pushing in a certain direction without having to move a stylus or finger around the screen. The widgets can provide four or eight directions of movement and remove the need for horizontal and vertical scrollbars.

The implementation of the described widget that does not require the user to press and move the finger in a controlled manner across the screen will make scrolling smoother and easier. With this new widget, it is possible to move images around the screen without obscuring the image such as occurs when a finger is placed over an image to move that image.

In operation, the user touches the widget 150 on the screen 110 and pushes in a certain direction by applying pressure and without moving the finger 160 over the surface of the screen 110. The sensors 130 along each edge of the screen 130 detect the motion. If a list is being viewed, the list will scroll either horizontally or vertically. An image 140 can be moved around the screen using up to eight directions of movement. A cursor can also be introduced and moved around the screen. The more pressure that is applied to the widget 150, the faster the list, cursor, or image will move.

Figure 2:
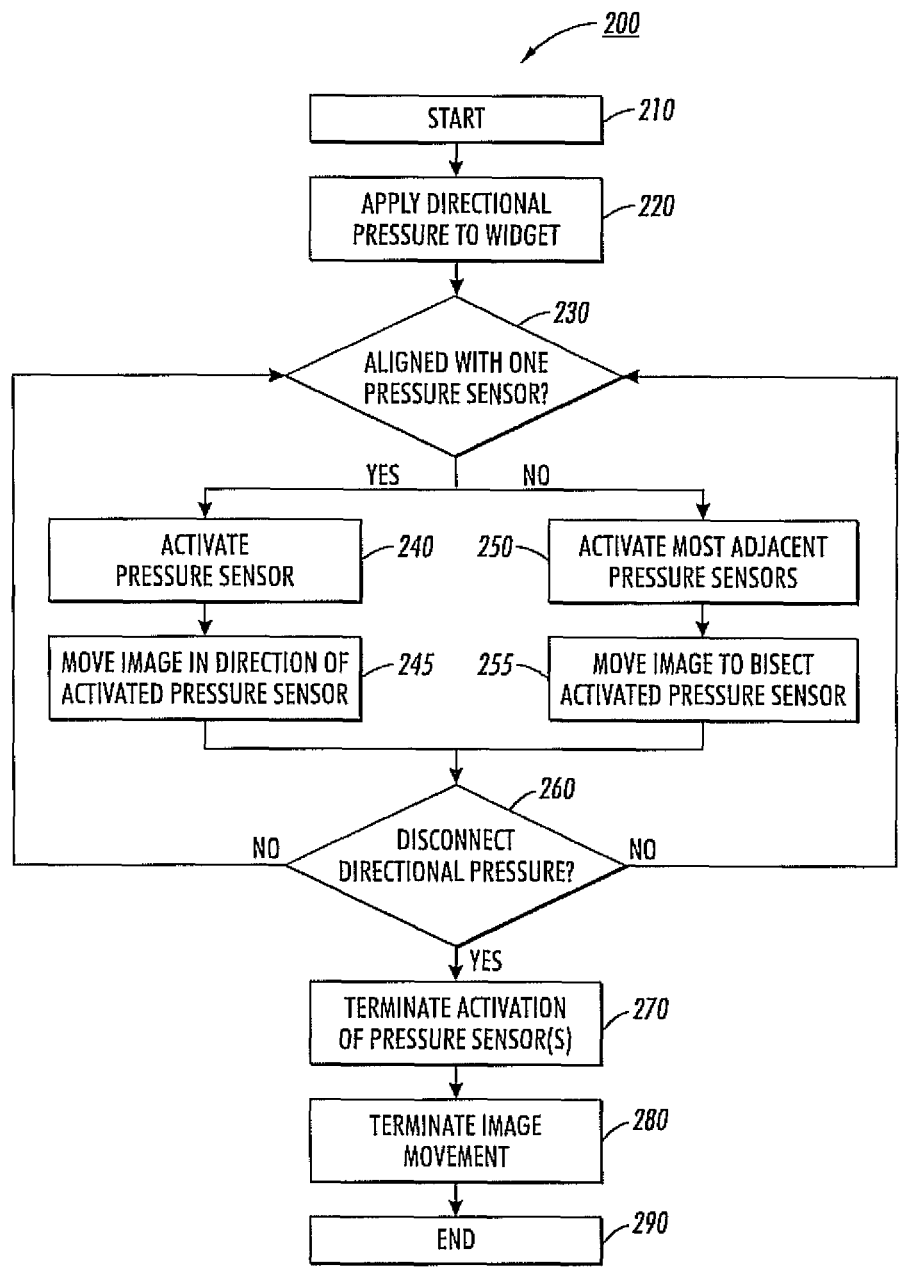
FIG. 2 is a process diagram in accordance with exemplary embodiments of the present teachings.

Referring to the process 200 of FIG. 2, and starting at 210, directional pressure is applied to widget 150 at 220. Responsive to the directional pressure, a determination is made if the directional pressure is aligned with one pressure sensor at 230. If yes, the one pressure sensor 130 is activated at 240. Activation of the at least one pressure sensor correspondingly moves image 140 in a direction of the activated pressure sensor 130 at 245. In the event that directional pressure is not aligned with one pressure sensor, i.e. directional pressure is between two pressure sensors, both pressure sensors are activated at 250 and movement of the image bisects the activated pressure sensors at 255. A determination is made as to disconnect of directional pressure at 260. If yes, activation of the pressure sensor(s) is terminated at 270 and thus image movement is terminated at 280. Operation ends at 290. It will be appreciated that directional pressure in one direction can be immediately followed by directional pressure in a different direction, thus moving an image around the screen in a number of directions prior to terminating directional pressure on the widget. Accordingly, the method can loop to accommodate different directional activities as shown. There is no limit to the number of sequential changes of directional pressure that can be applied to the widget.

It will be further appreciated that the respective shapes and relative configuration of components including, for example, the touch screen device, surface, sensors, image, and widget are not limited to those shown and may correspond in dimension, texture, orientation, and otherwise according to an intended end use without departing from the scope of the invention.

Although the relationships of components are described in general terms, it will be appreciated that one of skill in the art can add, remove, or modify certain components without departing from the scope of the exemplary embodiments.

Without being limited to any particular theory, it will be appreciated that the remaining components of the interactive user screen can include any of a known construction of touch screens. For example, there are a number of types of touch screen technology including resistive, surface acoustic wave, capacitive, infrared, strain gauge, optical imaging, dispersive signal technology, acoustic pulse recognition, micro-electro-mechanical (MEMS) devices, etc.

A resistive touch screen panel can be composed of several layers including two thin metallic electrically conductive and resistive layers separated by thin space. When an object touches the panel, the layers are connected at certain point; the panel then electrically acts similar to two voltage dividers with connected outputs. This causes a change in the electrical current which is registered as a touch event and sent to a controller for processing.

Surface acoustic wave technology can use ultrasonic waves that pass over the touch screen panel. When the panel is touched, a portion of the wave is absorbed. This change in the ultrasonic waves can register the position of the touch event and send this information to a controller for processing.

A capacitive touch screen panel can be coated with a material, typically indium tin oxide that conducts a continuous electrical current across the sensor. The sensor can therefore exhibit a precisely controlled field of stored electrons in both the horizontal and vertical axes and achieve capacitance. The human body is also an electrical device which has stored electrons and therefore also exhibits capacitance. When the sensor's 'normal' capacitance field (its reference state) is altered by another capacitance field, i.e., someone's finger, electronic circuits located at each corner of the panel can measure the resultant distortion in the sine wave characteristics of the reference field and send the information about the event to a controller for processing.

An infrared touch screen panel can employ one of two very different methodologies. One method can use thermal induced changes of the surface resistance. Another method can include an array of vertical and horizontal IR sensors that detect the interruption of a modulated light beam near the surface of the screen.

In a strain gauge configuration the screen can be spring mounted on the four corners and strain gauges can be used to determine deflection when the screen is touched.

In infrared devices, two or more image sensors can be placed around the edges (mostly the corners) of the screen. Infrared backlights can be placed in the camera's field of view on the other sides of the screen. A touch shows up as a shadow and each pair of cameras can then be triangulated to locate the touch.

Dispersive signal technology can use sensors to detect the mechanical energy in the glass that occur due to a touch. Complex algorithms can then interpret this information and provide the actual location of the touch. Since mechanical vibrations are used to detect a touch event, any object can be used to generate these events, including fingers and styli.

Acoustic pulse recognition can use more than two piezoelectric transducers located at certain positions of the screen to turn the mechanical energy of a touch (vibration) into an electronic signal. This signal can then converted into an audio file, and then compared to preexisting audio profile for every position on the screen. This system can work without a grid of wires running through the screen; the touch screen itself is pure glass It will be appreciated by those of skill in the art that several benefits are achieved by the exemplary embodiments described herein and include operation of virtually any known interactive touch screen without obscuring an image being moved on the screen, and improved existing scrolling and pointing mechanisms.

While the invention has been illustrated with respect to one or more exemplary embodiments, alterations and/or modifications can be made to the illustrated examples without departing from the spirit and scope of the appended claims. In particular, although the method has been described by examples, the steps of the method may be performed in a different order than illustrated or simultaneously. In addition, while a particular feature of the invention may have been disclosed with respect to only one of several embodiments, such feature may be combined with one or more other features of the other embodiments as may be desired and advantageous for any given or particular function. Furthermore, to the extent that The terms "including", "includes", "having", "has", "with", or variants thereof are used in either the detailed description and the claims, such terms are intended to be inclusive in a manner similar to the term "comprising." And as used herein, the term "one or more of" with respect to a listing of items such as, for example, "one or more of A and B," means A alone, B alone, or A and B.

Notwithstanding that the numerical ranges and parameters setting fort the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any an all sub-ranges between (and including) the minimum value of zero and the maximum value of 10, that is, any and all sub-ranges having a minimum value of equal to or greater than zero and a maximum value of equal to or less than 10, e.g., 1 to 5.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. An interactive touch screen comprising:
   a user interface screen;
   an interactive image arranged to be displayed in said user interface screen;

at least one pressure sensor positioned adjacent to and outside of a periphery of the user interface screen and along a lateral edge of the user interface screen; and a pressure sensitive widget separate from the at least one pressure sensor and positioned on a top surface of the user interface screen and responsive to lateral pressure applied to the user interface screen without a sliding movement over the surface of the user interface screen, thereby activating the at least one pressure sensor and manipulating the image in a direction of applied pressure, wherein a force applied to the widget directly corresponds to speed of movement of the image on the display.

2. The interactive touch screen of claim 1, wherein the pressure sensitive widget is activated without obscuring the display.

3. The interactive touch screen of claim 1, wherein the pressure sensitive widget is laterally stationary.

4. The interactive touch screen of claim 1, wherein the image comprises a cursor.

5. The interactive touch screen of claim 1, wherein the image comprises a scrollable file.

6. The interactive touch screen of claim 1, wherein at least four pressure sensors are positioned adjacent the periphery of the display.

7. The interactive touch screen of claim 1, wherein at least eight pressure sensors are positioned adjacent the periphery of the display.

8. The interactive touch screen of claim 1, wherein actuation of the widget in a direction of the at least one pressure sensor moves the image in a corresponding direction.

9. The interactive touch screen of claim 1, wherein actuation of the widget in a direction between two pressure sensors activates both pressure sensors.

10. The interactive touch screen of claim 1, wherein actuation of widget in a direction of a single pressure sensor activates only that pressure sensor.

11. The interactive touch screen of claim 1, wherein the widget is electrically connected to the at least one pressure sensor and image through the display.

* * * * *